United States Patent
Crisci, Jr.

[11] Patent Number: 5,449,128
[45] Date of Patent: Sep. 12, 1995

[54] SPOOLED MATERIAL RETAINER

[76] Inventor: Vince J. Crisci, Jr., 1026 W. University Ave., San Diego, Calif. 92103

[21] Appl. No.: 293,810
[22] Filed: Aug. 22, 1994
[51] Int. Cl.⁶ .............................................. B65H 55/00
[52] U.S. Cl. .................................. 242/580; 242/583; 242/125.3
[58] Field of Search .............. 242/125.2, 125.3, 580, 242/583; 43/25, 25.2

[56] References Cited

U.S. PATENT DOCUMENTS

| | | | |
|---|---|---|---|
| 3,048,906 | 8/1962 | Patterson | 43/25.2 |
| 3,196,034 | 7/1965 | Pandolfo, III | 242/580 |
| 3,836,094 | 9/1974 | Hollingsworth | 242/580 |
| 4,457,095 | 7/1984 | Stevenson | 43/25.2 |
| 4,512,462 | 4/1985 | Dills | 242/580 |
| 4,534,522 | 8/1985 | Spence | 242/125.3 |
| 5,200,245 | 4/1993 | Brodrick, Jr. | 428/100 |
| 5,214,874 | 6/1993 | Faulkner | 43/25.2 |
| 5,246,185 | 9/1993 | Vincent | 242/125.3 |

Primary Examiner—John P. Darling
Attorney, Agent, or Firm—Gilliam, Duncan, Harms

[57] ABSTRACT

A flexible strap retainer for material wound upon a drum or spool or reel and the free end thereof, comprising hook and loop material with a fastener affixed to one end thereof such that the fastener releasably attaches to the free end of the material to be wound upon the drum spool or reel. In use, the reel to be secured is wound and the flexible strap member attached to the distal end of the material to be wound is wound up upon the outside of the material wound upon the spool and removeably secures itself thereon when the opposing hook and loop fabric interlock.

14 Claims, 1 Drawing Sheet

SPOOLED MATERIAL RETAINER

BACKGROUND OF THE INVENTION

1. Field of the Invention

This invention relates to material to retainers for material wound upon a spool, drum, or reel, while permitting the easy removal of said retainer for allowing for use of the spooled material and reuse of the retainer. More particularly it relates to a spooled material retainer comprised a fastener for attaching a strap to the free end of the spooled material with the strap having hook and loop VELCRO type fastening material positioned on the surface of the strap so that when the spool is further rotated the strap is wound on itself causing the hook and loop material on the strap to interlock thereby securing the strap and free end of the spooled material to the outer diameter of the spooled material.

2. Prior Art

The winding of material upon a spool, drum, or reel type device for storage or use is a common practice in the United States and throughout the world. Fishing poles commonly use a crank driven gear to turn the spool upon which a line is wound during the act of landing the fish itself. Upon finishing ones fishing adventure for the day, line is wound upon the spool for storage until the next user's angling adventure. Or, upon deciding that the fishing may be more productive at another spot during ones fishing sojourn, anglers commonly wind their fishing line up during their time of transport to a more productive site.

Another common practice is using a vehicle mounted gear driven winch consisting of a spool upon which rope, cable, or webbing is wound to move the vehicle itself or material which the user wishes moved. In moving a stuck vehicle, the wound up material is unwound from the spool and attached to a stationary object. The spool is then mechanically activated to wind up the unwound material thus moving the vehicle from its stranded position. If a heavy item is to be moved the spool is also unwound and the rope, cable, or webbing, is secured to the material to be moved. The material is moved upon activation of the mechanically driven spool.

Spools are also used to wind magnetic tape and many other elongated materials which are easily wound for storage.

An especially vexing problem facing most persons in the use and reuse of spooled material for its particular purpose, is securing the wound material itself to the spool in a manner rendering it easy for reuse and unwinding but fastening it securely enough to the spooling device to alleviate the problems encountered if the material unwinds.

One can tie the loose end of the material to another loop of material on the spool, however this requires that the secured material eventually be cut for reuse and can cause tangles in the roper or cable. The user can tape the material to the spool using adhesive tape, however the tape must be thrown away after one use and when used on material such as thin monofilament fish line, this method can cause tangles or a breakage of the line. Many a frustrated angler, upon finding his fishing line tangled after storage, or transport to a new fishing site opts to throw away the tangled line and start with a fresh reel.

There have been a number of approaches advanced in the past to overcome the aforementioned problems.

U.S. Pat. No. 5,214,874 Faulkner, teaches a hook and loop fastener for a fishing reel. However, unlike the present invention, Faulkner teaches a hook and loop fastener which is secured around the fishing rod and not the reel itself. Further, there is no attachment means on the Faulkner invention to secure the fastener to the fish line without the hook attached to the line. Faulkner thus teaches the use of hoop and loop fastening material to temporarily fasten an article to a rod like element such as a fishing pole and not the reel itself with the requirement of detaching the hook.

U.S. Pat. No. 5,246,185 inventor Vincent reveals a retainer for filament material wound upon a drum. However Vincent teaches away from firmly securing wound material upon a drum in a secure fashion in that it allows the wound material to be easily removed from the drum while the Vincent invention is secured to the reel by grasping the unsecured free end of the wound material and pulling it to the desired length.

Another approach to securing fishing line to avoid tangles is that of U.S. Pat. No. 4,457,095 Stevenson which teaches a line securing device which is attached to a fishing pole and secures the monofilament material for immediate reuse of the fisherman when stored for a short time. Stevenson can be used to secure a line to a pole, however it cannot secure a line to the outside portion of the reel itself and allow for reuse of the retainer. Neither does Stevenson allow for the end of the line itself or a fishing lure or hook attached to that line to be attached to the invention. Further, Stevenson does not allow for the winding up of the fishing line totally upon the reel and thus the secured line, hanging loose and inviting seizure by objects which seem to abound for such purposes around fishing line, can become tangled upon the pole or other objects, and is thus subject to breakage and tangling during transport and storage.

U.S. Pat. No. 5,200,245 Brodrick reveals a hook and loop fastening strap. However, Brodrick lacks an easily disattached attachment means mounted at one end of the retainer to secure the cable, rope, or monofilament that is to be wound upon the reel, to the fastening strap itself. Thus Brodrich provides no easy continuously reusable means to attach, and remove, the retainer to a fish line or a cable or rope to be wound upon a reel.

There exists as such, a need for a reusable securing device for securing the spooled material and its free end thereof wound upon a spool, drum, or reel, capable of securing the wound material in a secure position and protecting that material from abrasion until reuse. Such a securing device should be easily attached, and removed from both the reel and to the material to be wound itself, or, to a hook or other device attached to the loose end of the material to be wound. Such a securing device should secure itself upon the reel around the outside of the material to be wound, secured, and protected, when it is wound thereon by the user. Yet it should also be securable to other objects other than the reel itself.

SUMMARY OF THE INVENTION

The above discussed and other drawbacks and deficiencies of the prior art are overcome and/or alleviated by applicant's invention which is a flexible strap member made of a portion of each of hook and loop fabric affixed together in a position wherein the hook fabric is opposed or on the opposite strap surface from the loop fabric.

A fastener suitable in design and purpose of attaching to free end of the material being wound on the reel is removably or permanently attached as required to one end of the flexible strap member. By affixing the fastener to one end of a hook and loop fabric strap, the strap is easily attached, removed, and reattached to the material to be wound upon the reel.

Because the hook and loop fabric are affixed together into a flexible strap member in opposed positions, when the reeling device is wound, the material wound upon the reel, drum, or spool, pulls on the fastener, which pulls the flexible strap member upon the outside diameter of the material wound upon the reel, spool, or drum. The hook and loop fabric then self affixes together upon itself into a semi permanent position around the material wound on the reel. This not only secures the wound material in place until the next use, and, depending upon the width of the fabric, the flexible strap member can be made to protect the wound material by fully encompassing it under the strap material on the reel. In one of a number of methods of securing material upon a reel or spool the user would proceed by unthreading the line free end from a reel line and thereafter attaching releasably the free end of the line to be wound to the end to a clip secured to the end of the band invention which has hook material on at least a portion of one side and loop material on at least a portion of the opposite side and winding line on the reel until band invention wraps around the accumulated line which allows the hook and loop materials on opposite sides if the invention to come into engagement thus firmly and removably securing said line in place on the reel.

In summary, the present invention comprises a flexible strap member for securing material wound upon a spool, drum, or reel, in an easily reversible and/or reusable fashion while protecting the wound material from abrasion or damage while it is in storage or transport and being easily attachable, and removable from the material itself using the appropriate fastening device affixed to the flexible strap.

The invention comprises a length of hoop and loop fastening material with the hooks and loops fixedly attached to opposites sides thereof with an attachment means affixed to one end of the spooled material retainer. The attachment means can be of any type suitable to releasably attach to the material to be wound upon the reel. The attachment means thus allows for the easy attachment or disattachment of the length of hoop and loop material to be wound upon the reel. The attachment means can be a simple hole in a metal or plastic fastener to allow for the insertion of the hook or fastener on the end of a rope, cable, or monofilament line, or the attachment means could be a fastener specifically designed to grip the material to be wound upon the spool. The attachment means is attached to the distal end of the material to be secured upon the reel or drum and when wound upon the reel or drum the loop and hoop fabric engage each other and hold the distal end of the material in place on the reel or drum.

In one preferred embodiment the attachment means can be an aperture with some form of a spring biased closure means on the inside which collapses the passage formed by the aperture and places pressure upon the material to be wound.

A second preferred embodiment of the invention features an alligator or similar type clip type attachment means removably secured to one end of the spooled material retainer thus allowing for the easy attachment and detachment of the invention form the material to be wound upon and secured upon the reel. This embodiment would work especially well with rope, cable, or strapping used upon a winch, or, in miniature form, with fishing line wound upon a common fishing reel. In fact, the fisherman would have his option to remove or leave the hook upon the line since the clip like device will grip either the hook or the line for winding purposes.

A third embodiment of this invention would have the hook and loop fabric of a width sufficient to cover the area of the reel, or spool where line material is wound. Once the hook and loop fabric reached its self secured position the fabric would cover the entire spool area where line is wound and thus protect it from abrasion and tangles.

A fourth embodiment of the invention can be used to secure magnetic tape to its reel. By using non curing adhesive upon one end of the spooled material retainer, the magnetic tape could be temporarily attached to the invention which is thereupon wound upon the outside of the tape upon its reel.

An object of this invention is to allow the easy securing and unsecuring of material wound upon a drum, reel, or other cylindrical winding device upon the winding device itself and a method therefore.

An object of this invention is to allow the easy securing and unsecuring of the loose end of material wound upon a drum, reel, or other cylindrical winding device upon the winding device itself or upon a rod or the mounting area of the reel.

Another object of this invention is to allow for the continual reuse of the securing device as opposed to having to dispose of it after each use.

Still another object of this invention is to allow for the easy attachment, and release of the invention to the material to be secured by use of an attachment means suitable for the purpose intended which is affixed upon one end of the invention.

Still another object of this invention is to allow for the easy securing and unsecuring of a fishing line to the pole during periods of transport.

Yet another object of this invention is to allow for the easy securing and unsecuring of fishing line or other material wound upon a reel, drum, or spool, during storage and/or transport.

A further object of this invention is to allow for the protection of the material wound upon the reel from abrasion, cutting, or tangling by covering the material outside diameter of the wound material with the strap member portion of the invention.

Further objects of the invention will be brought out in the following part of the specification, wherein detailed description is for the purpose of fully disclosing the invention without placing limitations thereon.

BRIEF DESCRIPTION OF DRAWING FIGURES

DETAILED DESCRIPTION OF PREFERRED EMBODIMENTS OF THE INVENTION

Figure 1:
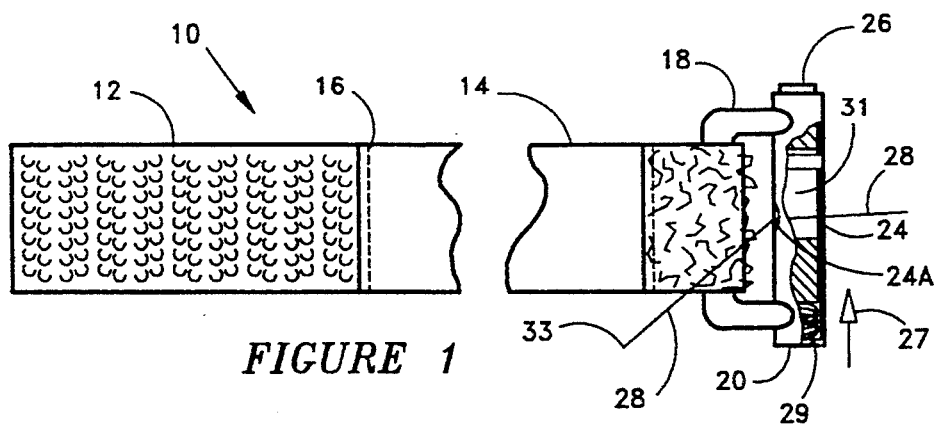
FIG. 1 is top plan view of the invention showing an attachment means affixed to one end and separate portion of hook fabric and loop fabric affixed together.

Referring now to the drawing figures:

FIG. 1 is a showing of the preferred embodiment of the invention including a flexible strap member 10 comprised of a portion of hook material 12 of a sufficient length for the intended purpose combined with a portion of oppositely directed loop material 14 of sufficient length for the purpose intended. Hook and loop material are interconnected at location 16. Location 16 could be located at any location along the length of the strap member 10 determined by the diameter of the structure upon which it is to be wound. At the location 16 the hook loop material are interconnected by sewing, heat sealing, gluing, grommeting, or some other attachment means determined to be appropriate for the end use of the invention. An attachment member 18 is loosely attached to end 20 of the strap member 10. Either the hook or loop may be used at one end of the strap member and the opposite hook or loop material at the opposite end thereof so long as when the strap member is wound upon a reel or drum or the like the hook material 12 will overlay and attached to the loop material 14 such that when wound upon a reel or drum that the hook side of the hook material 12 is opposed to the loop side of the loop material 14. The attachment member 18 has an aperture 24 located upon its side which extends to a matching aperture 24A on the opposite side of the cylinder portion 20 of the attachment member 18. A piston 26 normally biased along arrow head 27 by bias spring 29 has an aperture 31 located therethrough which lines up with the cylinder aperture 24 located upon the attachment means 18 when the protruding portion of the piston 26 is manually depressed opposite to the direction of arrow head 27. In use, the protruding portion of the piston 18 may be pushed into the cylinder against the bias of spring 29 which will line up the apertures 24 and 24A in the cylinder and aperture 31 in the piston to allow for the insertion of the free end 33 of material 28 to be secured. Materials such as monofilament fish line, thread, or thin fibers could be easily and removably secured to the attachment member 18 in this manner.

Upon release of the protruding portion of the piston 26, the apertures misalign applying pressure to, and removably securing, the inserted material 28 to the attachment means 18 for wind up upon the reel as mentioned above (see drawing FIG. 5). The size, shape, and location of the apertures 24 and 24A will vary in a manner to be sufficient to allow for proper temporary attachment of the free end 33 of material 28 to be wound upon the reel or spool. A slot might be substituted for the apertures 24 and 24A in the event that webbing or strapping is the material to be wound upon the reel. Further, the apertures 24 and 24A and 31 through the attachment member 18 may be of a very large size if the material to be secured is a steel cable or the material has a large diameter or a large diameter hook or attachment upon its distal end. Or may be the apertures 24 and 24A and 31 through the attachment member 18 may be of a miniature size if the material to be wound is monofilament or nylon fishing line with a small hook 35 on the end.

Figure 2:
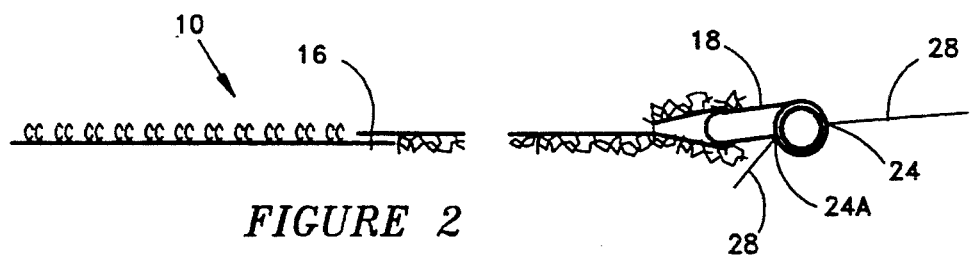
FIG. 2 is a side view of the invention showing an attachment means affixed to one end and separate portions of hook fabric and loop fabric affixed together.

FIG. 2 is a side view of the flexible strap member 10 of drawing FIG. 1 showing the hook surface 12 of the hook material opposed to the loop surface 14 of the loop material and the attachment member 18 and piston 26. So long as the hook surface 12 of the hook material is on the opposite side of the strap member 10 from the loop surface 14 of the loop material the strap member will releasably secure itself to the outside of the reel upon which it is wound. Thus the length of either the hook material portion of the flexible strap member 10 or the loop material portion can be interchanged to fit the purpose intended and the attachment means 18 can be mounted upon either end of the flexible strap member 10 depending again upon the purpose of the user and the material to be wound. The width of the strap member 10 can also be changed should the user wish to have the material wound upon the spool protected by the layers of the strap member wound thereon.

Figure 3:
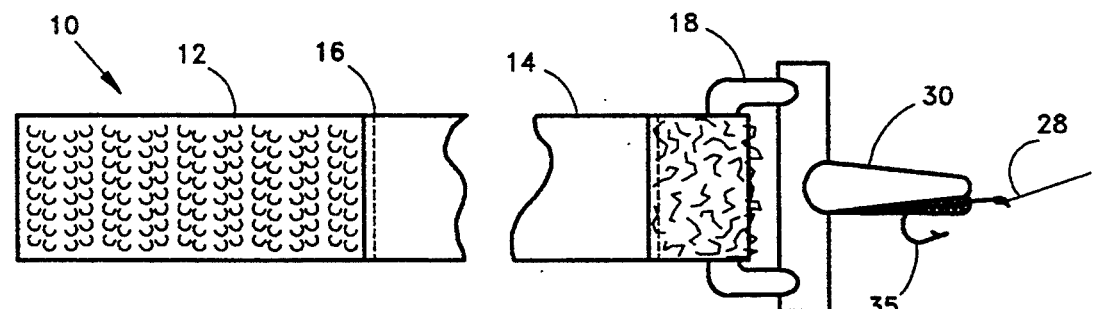
FIG. 3 is a top plan view of a second embodiment of the invention showing the attachment means being an alligator type clip affixed to one end of the invention.

FIG. 3 is a top plan view of a second embodiment of the invention featuring the flexible strap member 10 comprised of a portion of hook material 12 of a finite length for the intended purpose combined with a portion of loop material 14 at a point determined to be appropriate 16 for the intended purpose in the manner of attachment discussed above. The attachment member 18 is affixed to one end of the strap member 10. Either end of the strap means 10 can be used as the mounting point as aforementioned. The attachment means 18 has a jaw like clip 30 attached thereto which exerts pressure upon and therefore removeably secures a fish hook 35 or the like which is attached to the free end of the material 28 to be wound on a reel or the like (see drawing FIG. 5). However, the jaw like clip 30 could just as easily attached to the free end of the material 28 without the hook 35. The type and jaw configuration of the pressured exerting clip can be any type of commercially available clip depending upon the material to be secured between the jaws 28. While a fish hook 35 is shown, many types of devices are fit upon the end of cable, rope, twine, webbing, and fish line. As such, a multitude of configurations and clamping devices can be used depending upon what is to be clamped upon or secured to the attachment means to be wound. FIG. 3 depicts an alligator type clip 30. However, commercially available clips of a configuration to clamp upon cable, webbing, rope, and other materials which are wound upon a reel can be substituted, or specially designed and substituted depending upon the application.

Figure 4:
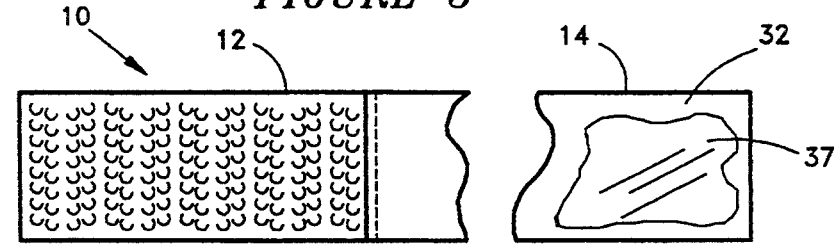
FIG. 4 is a top plan view of a third embodiment of the invention having reusable adhesive on one side of one end of the invention.

FIG. 4 depicts a top plan view of the invention featuring the flexible strap member 10 comprised of a portion of hook material 12 as aforementioned. An attachment area 32 located at one end of the flexible strap 10 is coated with a releasable adhesive, i.e. an adhesive which never completely cures and remains tacky is affixed to one end of the strap member 10. Either end of the strap means 10 can be used for this purpose. This embodiment would work well to secure webbing, strapping, or magnetic tape or tape like material to the reel upon which it is wound.

Figure 5:
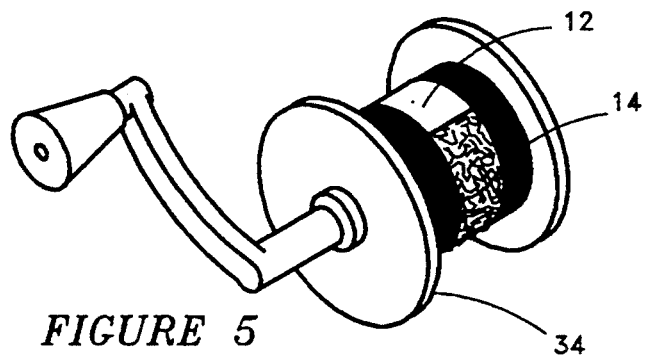
FIG. 5 is a perspective view of the invention in use upon a common fishing reel with the invention secured around the outside diameter of the material which is wound upon the reel.

FIG. 5 is a perspective view of the invention in use wherein the hook material 12 has secured to the loop material 14 around the outside of the material which is wound upon the reel 34 thus securing the wound material to the reel and protecting the outside material which is so wound from abrasion, or other harm.

While all of the fundamental characteristics and features of the invention have been shown and described, it should be understood that various substitutions, modifications, and variations are included within the scope of the invention as defined by the following claims.

What is claimed is:

1. A retainer for the free end of material wound upon a drum or spool or reel, comprising, a flexible strap member having first and second ends and having opposed first and second surfaces, said strap member further being divided into first and second portions with said first portion terminating at said second portion;

an attachment means affixed to one of said first end and said second ends, said attachment means for releasably attaching to free end of said material wound on said drum or spool by said flexible strap member;

a plurality of hooks disposed on said first portion of one of said surfaces of said strap member; and a plurality of loops disposed on said on said second portion of one of said surfaces of said strap so that said hooks detachably engage said loops when said flexible strap is wound upon said spool thereby securing said free end and said material on said spool.

2. The invention as described in claim 1 wherein said attachment means comprises a cylinder having an aperture therethrough, a translatable piston with an aperture therethrough located within said cylinder, spring biasing means for biasing said piston is a first direction within said cylinder whereby when said piston is translated in a direction against the bias of said spring bias means said apertures on said cylinder and said piston are aligned and the free end of said material can be passed through all of said apertures and when said bias is released said free end is secured within all of said apertures.

3. The invention as describe in claim 2 wherein said material to be wound upon said reel is fishing line.

4. The invention as describe in claim 2 wherein said material to be wound is one of a group of rope, cable, and webbing.

5. The invention as described in claim 1 wherein said attachment means employs an alligator type clip.

6. The invention as describe in claim 5 wherein said material to be wound upon said reel is fishing line.

7. The invention as describe in claim 5 wherein said material to be wound is one of a group of rope, cable and webbing.

8. The invention as described in claim 1 wherein said attachment means employs a pressure exerting clip.

9. The invention as describe in claim 5 wherein said material to be wound upon said reel is fishing line.

10. The invention as described in claim 1 wherein said attachment means is a releasable adhesive.

11. The invention as describe in claim 1 wherein said material to be wound upon said reel is fishing line.

12. The invention as describe in claim 11 wherein said reel is a fishing reel.

13. The invention as describe in claim 1 wherein said material to be wound upon said reel is one of a group of rope, cable, and webbing.

14. The method of securing line on a casting reel for prevention of loosening, unwinding, tangling and abrasion of the line on a fishing reel of the type having a reel axis substantially perpendicular to the line direction in use which comprises the steps of:

unthreading the line free end from a reel;

attaching releasably the free end of said line end to a clip secured to the end of a band having hook material on at least a portion of one side and loop material on at least a portion of the opposite side;

winding said line on said fishing reel until said band wraps around the accumulated line; and allowing the hook and loop materials on said sides to come into engagement, whereby said line is firmly held in place on said reel.

* * * * *